United States Patent Office 3,233,926
Patented Feb. 8, 1966

3,233,926
DEFORMED RING PIPE JOINT
Bernhard Walterscheid-Müller, Lohmar, Germany, assignor to Jean Walterscheid K.G., Siegburg-Lohmar, Rhineland, Germany
Filed Jan. 8, 1963, Ser. No. 250,134
Claims priority, application Germany, Jan. 9, 1962, W 31,437, W 31,438; Feb. 7, 1962, W 31,636
6 Claims. (Cl. 285—341)

The invention relates to pipes and particularly to pipe unions.

According to the invention a screwed pipe union with a metal packing ring, having the pressure faces of the union bearing on sloping, conical faces of the packing ring and causing radial contraction of the ring against the surface of the pipe, is provided in which each of the threaded parts has at least one annular ridge, formed by the junction of two surfaces, projecting towards the packing ring, and the packing ring has saw-tooth-shaped ribs on its inner wall, at least at each end, so that when the threaded parts are screwed up, the ribs penetrate radially into the surface of the pipe, without material deformation of the packing ring.

The device according to the invention differs from the existing so-called "cutter rings," the front parts of which are provided with a cutting edge, which is pressed axially against a concave conical pressure surface and so is forced deeply into the surface of the pipe.

The invention has among its objects to enable a pipe to be so well sealed and so firmly gripped that the pipe will burst under high pressure before the union will give way.

A further purpose of the invention is to ensure that the annular ribs on the packing ring shall penetrate slightly into the surface of the pipe and shall form a barrier at each end, with respect to the longitudinal axis, while being capable of withstanding high axial pressures.

The invention has among its further objects to prevent the turning of the packing ring while the screwed bushing is being tightened. Finally, the invention provides for the design of the packing ring to be such that a distinct torque resistance is felt when one tightens the screwed bushing, from which one can judge that the deformation of the packing ring is complete and the seal satisfactory. A particular advantage of the invention is that the pipe union can also be used for sealing pipes of all kinds made of plastics.

The invention is diagrammatically illustrated by way of example in the accompanying diagrammatic drawings in which FIGURE 1 is a longitudinal section through the upper part of a screwed pipe union according to the invention.

Figure 1:
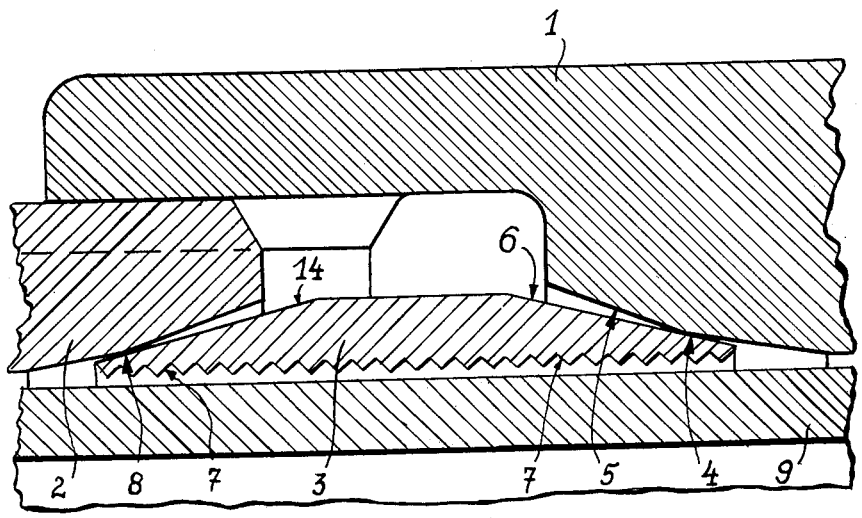

FIGURE 1 of the drawings shows a packing ring 3 in longitudinal section, with the surrounding members of the pipe union, 1 and 2. The pipe union member 1, which is in the form of a screwed bushing, has an annular ridge 4 formed at the junction of two pressure faces 5. As the screwed bushing 1 is tightened, this annular ridge 4 rides up against the conical face 6 of the packing ring 3 and causes radial deformation of the packing ring 3. Ribs 7, provided in the interior walls of the packing ring 3, are pressed into the surface of the pipe 9 radially and without axial displacement. Angle α, between the conical faces 5 and 6, should be as acute as possible, since the material of the packing ring 3, after deformation, is intended to offer noticeable resistance to the tightening of the screwed bushing 1.

On the counter union member 2 an annular ridge 8 is provided which bears against the conical face 14 of the packing ring 3 at a position which ensures that the ribs 7 shall be pressed into the face of the pipe 9 at the end of the pipe.

Figure 2:
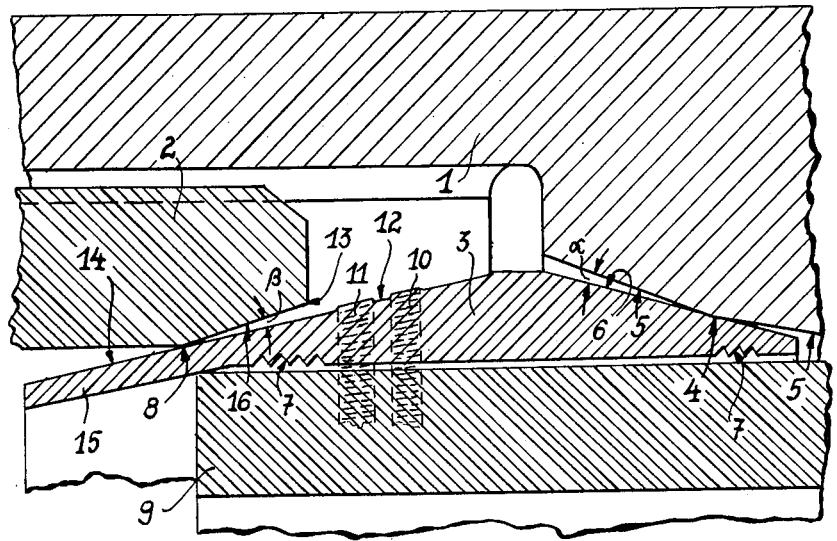
FIGURES 2 and 3 are longitudinal sections showing the initial and final stages of tightening in an alternative embodiment of the screwed pipe union having a packing ring with special grooves or knurlings.
Figure 3:
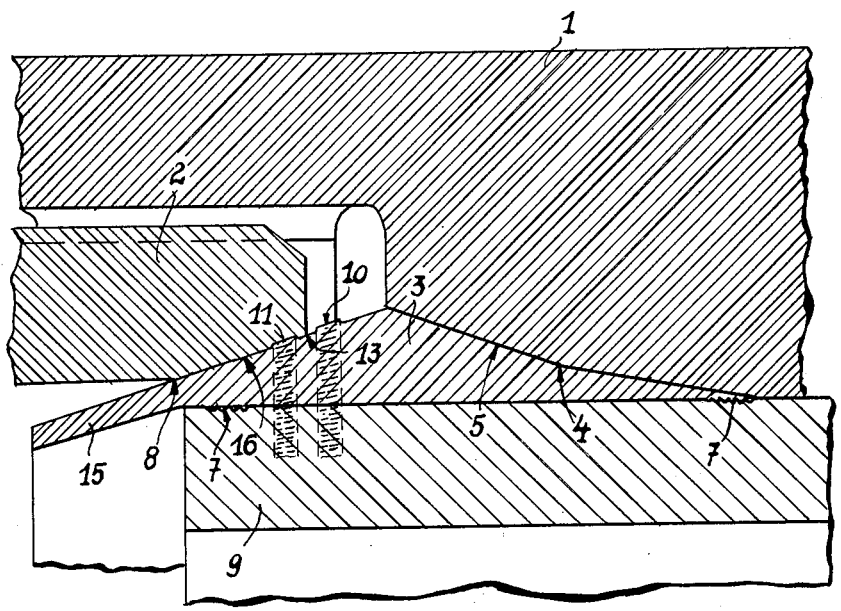

In the examples shown in FIGURES 2 and 3, the same face of the ring 14 has grooves or knurlings, 10 and 11, running parallel to the axis. These knurlings 10 and 11 should be so disposed that the annular ridge 8 presses into face 14 of the packing ring below knurling 11, but, as deformation proceeds, a tight closure is formed between the knurlings 10/11 and the pressure face 16 of the counter union member 2. Once these two faces are in contact, they form an effective brake on any tendency of the packing ring 3 to be carried round with the screwed bushing 1 in course of tightening.

Between the knurlings 10 and 11 is a smooth surface 12, which forms a break in the axial knurlings and is a further protection against leaks. This additional seal becomes effective as soon as the edge 13 meets the surface 12. However, even if, for example, because of some disconformity in the outside diameter of the pipe, the ring has to be subjected to extra deformation inwardly, so bringing the knurlings 10 partly or completely under the sloping face 16, the surface 12 preserves its additional sealing function, since the grooves in 10 and 11 do not run into surface 12, but are blocked off from the surface 12 by the material thrown up.

In any event, by reason of the existence of the two edges 8 and 13, a firm grip and a reliable seal will be ensured. Angle β, between the faces 16 and 11, should be as acute as possible, say 1° (for clarity the angle is shown enlarged in the drawing) so that the effect aimed at by the invention may be obtained without the need for relative axial movement.

FIGURE 3 shows the packing ring 3 after deformation. As can be seen, the edge 13 has come into contact with the smooth surface 12 between the knurlings 10 and 11. Though only a few of the ribs 7 in the inner wall are shown the invention envisages the provision of as many ribs 7 as desired, but it is advisable, for practical reasons, for these to be continuous.

FIGURES 2 and 3 also show how the face 14 of the packing ring 3 is extended beyond the end of the pipe 9 to form an extension 15 in the shape of a hollow cone. This slope, which is highly advantageous from the manufacturing standpoint, ensures that the packing ring 3 can be slipped over the pipe 9 from one end only, since the diameter of ring 3 along extension 15 is too small to enable this part to be fitted over the pipe. The extension 15 constitutes an effective stop for the pipe since the packing ring 3 can be drawn only so far onto the end of the pipe, before the pipe end comes up against the inside of extension 15. The fitter then knows that the packing ring 3 is in the right position, without having to bother with measurements.

Figure 4:
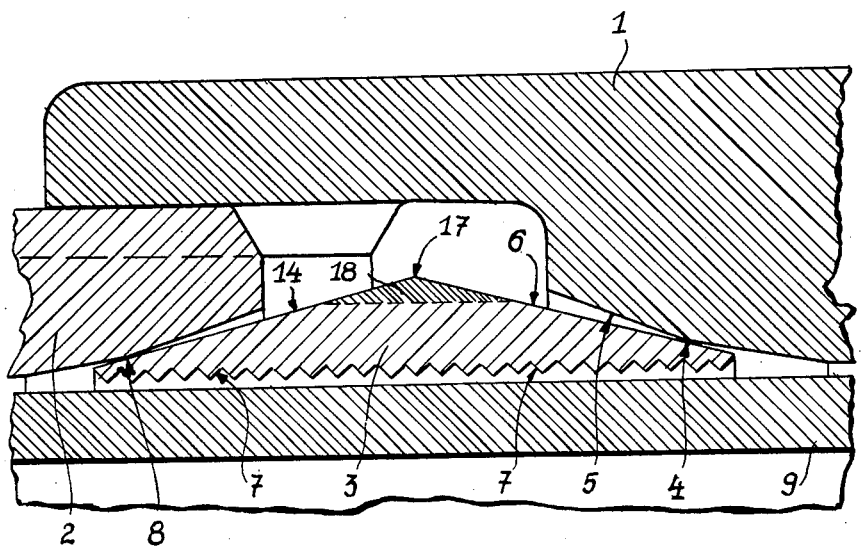
FIGURE 4 is a longitudinal section of the construction illustrated in FIGURE 1 but with special packing ring.

In the construction shown by way of example in FIGURE 4, the conical surfaces 6 and 14 of the packing ring 3 have been extended farther towards the middle, until at 17 they either meet abruptly or run off into a short cylindrical portion, such as may result, for example, from slight variations in course of manufacture. The packing-ring material numbered 18, which in longitudinal section is substantially cone-shaped, is additional to that which appears in FIGURE 1. It might be considered that the use of extra material should be avoided, since it results in a slight increase in the dimensions of the screwed ring joint, besides which the packing ring requires more material for manufacture. These drawbacks, however, are all a matter of degree and are of no consequence whatever in the face of the added advantage of the construction, namely that this additional material 18 has the effect of limiting the tightening of screwed bushing 1 and so preventing possible over-tightening. There is an acute angle between the pressure surfaces 5 and faces 6 and 14. This ensures that the annular ridge 4 will certainly be the first part to be forced into the faces 6 and 14 of the packing ring 3. Hence, even allowing for any tolerance variations, it is certain that the ribs 7 will first of all be forced into the surface of the pipe 9. It is only when this has taken place that the packing-ring material 18 will be brought into play; this material will then offer quite appreciable resistance to the further tightening of the screwed bushing 1, and the fitter will therefore know that the packing ring 3 has undergone the resquisite deformation.

The invention benefits materially if the packing ring 3 is superficially hardened, and more particularly carburised. Though this appears contradictory, because case-hardening, as such, presents considerable resistance to the deformation of the packing ring 3, it is nevertheless considered that operation is as indicated.

In fact, however, in the initial stage of deformation, there is no more than a straight-line contact between the annular ridge 4 of the screwed bushing 1 and the annular ridge 8 of the counter-member 2, on the one hand, and faces 6 and 14 of the packing ring 3 on the other, so that a high pressure per unit area is exerted. What is important is that this surface pressure by the annular ridges 4 and 8 may be regarded as being propagated cone-fashion through the material of the packing ring 3. As only the surfaces at 6 and 14 of the packing ring 3 are hardened, the main bulk of the packing ring 3 is still capable of plastic deformation. Under the influence of the heavy surface pressure per unit area exercised by the screwed bushing 1, the packing ring 3 as a whole gives way, with the result that the ribs 7 in the inner wall of the packing ring 3 press themselves into the surface of the pipe 9 with considerable force and there create firm seals and anchorages. As the screwed bushing 1 is further tightened, the annular ridge 4 rotates in relation to the packing-ring face 6. This relative movement results in the ridge 4 simply grinding down on the face 6 of the packing ring 3 and thus gradually forcing the ribs 7, on the inner wall, into the surface of the pipe 9.

If a packing ring 3, according to the invention, is cut open, after deformation, along its longitudinal axis, it will be found that at least four of the ribs 7 provided on the face of the packing ring 3 will have been forced radially into the surface of the pipe 9, without axial displacement, and will have left unbroken circular grooves behind. The depth of these circular grooves in the surface of the pipe 9 decreases towards the middle of the packing ring 3. At the end of the packing ring 3 which lies towards the counter-union member 2, the ribs 7 of the packing ring 3 will also have been forced into the surface of the pipe 9, though perhaps not in the same numbers as at the end that lies nearer the screwed bushing 1.

It is therefore apparent that the essential operation is not so much to drive the material of the packing ring 3 so that it swells to some extent, in order that it may be contracted and compressed between a pressure surface 5 of the screwed bushing 1 and the surface of the pipe 9, but rather that the annular ridge 4 of the screwed bushing 1 and the annular ridge 8 of the counter-member 2 shall transmit force, radially or at a slight angle, through the material of the packing ring 3, and directed on to the ribs 7 on the inner wall of the packing ring, so that these ribs may be forced deeply enough into the surface of the pipe 9.

It must be stressed, however, that the depth of this penetration is appreciably less than with existing cutter rings. In the device according to the invention no ridges are thrown up. It is therefore possible to split open the used packing ring 3, and remove it from the end of the pipe, and then to make a fresh union with the pipe 9, without cutting the end back, by the use of a fresh packing ring 3. This is not usually possible with unions made with cutter rings.

All that a cutter ring does is to produce a radial constriction of one end of a packing ring that is moved axially, so that the cut edge may penetrate the surface of the pipe axially and radially. At the end of the packing ring lying towards the screwed bushing, on the other hand, no seal is created.

With the device according to the invention, however, the packing ring 3 is caught between two annular ridges, 4 and 8, from which forces of action and reaction are thereupon exerted, through the material of the packing ring 3, on the inner face of the ring, in order that the ribs 7 on this inner face shall be forced into the surface of the pipe 9 at both ends of the packing ring 3.

It is of interest to note that a considerable increase in efficiency, of the sealing produced and the anchoring of the pipe 9, can be obtained by superficial hardening, and more particularly carburising, of the entire surface of the packing ring 3. Here again, the invention points to the advantage of having the packing ring made of tempered steel.

I claim:

1. A compression fitting adapted sealingly to engage a pipe having a closed peripheral surface, said fitting comprising a ring of relatively hard but deformable material surrounding said pipe and having an annular surface juxtaposed with the peripheral surface of said pipe and having a pair of beveled end faces; a pair of threadedly interconnected clamping members surrounding said pipe and having respective annular abutment faces adapted to bear against said beveled end faces when said members are threadedly drawn together, each of said abutment faces being formed as a pair of angularly adjoining frustoconical surfaces lying at different angles with respect to the longitudinal axis of said pipe so as to form a respective annular edge of obtusely angular cross-section at the junction between the frustoconical surfaces of each abutment face, the frustoconical surfaces of each abutment face including a first conical surface overlying said packing ring and lying at an angle with respect to said pipe axis less than that of the respective beveled end face and a second frustoconical surface extending axially inwardly from said first frustoconical surface and lying at an angle with respect to said pipe axis larger than that of the respective beveled end face, said packing ring having its major portion formed of a softer material than said clamping members, said packing ring being formed with relatively closely axially spaced annular inwardly directed cutting teeth along said annular surface for penetrating said peripheral surface upon threaded interconnection of said members whereby said annular edges bite into said beveled end face as said members are rotated relatively and force material of said packing ring between said first and second frustoconical surfaces and said pipe until said second frustoconical surfaces are brought into extended surface contact with said packing ring.

2. A compression fitting as defined in claim 1 wherein at least part of said ring consists of hardened steel.

3. A compression fitting as defined in claim 1 wherein at least part of at least one of said beveled end faces is knurled in a region engageable by the respective abutment face for entrainment thereby to prevent rotation of said packing ring as said members are rotated relatively.

4. A compression fitting as defined in claim 3 wherein the knurled portion of said one of said beveled end faces is an annulus whose radius is greater than that of the annular cutting edge of the respective abutment face.

5. A compression fitting as defined in claim 4 wherein two such knurled annuluses are axially spaced along said one of said beveled end faces and have a relatively smooth annular band between them, said band having a radius substantially equal to that of the respective annular cutting edge.

6. A compression fitting as defined in claim 1 wherein said beveled end faces merge at a median transverse plane of said packing ring and form a ridge at said median plane whose diameter is greater than the maximum diameters of said second frustoconical surfaces for limiting axial interfitting of said members beyond a predetermined point.

References Cited by the Examiner
UNITED STATES PATENTS

| | | | |
|---|---|---|---|
| 1,143,816 | 6/1915 | Duffy | 285—339 |
| 1,327,101 | 1/1920 | Leahy | 285—341 |
| 2,233,214 | 2/1941 | Lamont | 285—341 |
| 2,490,620 | 12/1949 | Cole. | |
| 2,613,959 | 10/1952 | Richardson | 285—341 |
| 2,641,489 | 6/1953 | Hedberg. | |
| 2,934,362 | 4/1960 | Franck. | |
| 3,040,284 | 6/1962 | Connell. | |
| 3,107,108 | 10/1963 | Greene | 285—341 |

CARL W. TOMLIN, *Primary Examiner.*

EDWARD C. ALLEN, *Examiner.*